US011422589B1

(12) United States Patent
Chen et al.

(10) Patent No.: US 11,422,589 B1
(45) Date of Patent: Aug. 23, 2022

(54) PORTABLE ELECTRONIC APPARATUS

(71) Applicant: Acer Incorporated, New Taipei (TW)

(72) Inventors: Hung-Chi Chen, New Taipei (TW); Huei-Ting Chuang, New Taipei (TW); Shun-Bin Chen, New Taipei (TW); Chao-Di Shen, New Taipei (TW); Chia-Bo Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/476,421

(22) Filed: Sep. 15, 2021

(30) Foreign Application Priority Data

Feb. 18, 2021 (TW) .................... 110105475

(51) Int. Cl.
*G06F 1/16* (2006.01)
*G06F 3/0362* (2013.01)
(52) U.S. Cl.
CPC .......... *G06F 1/1669* (2013.01); *G06F 1/1671* (2013.01); *G06F 3/0362* (2013.01)
(58) Field of Classification Search
CPC ..... G06F 1/1669; G06F 1/1671; G06F 3/0362
USPC ........................................................ 345/168
See application file for complete search history.

(56) References Cited

U.S. PATENT DOCUMENTS

| | | | | |
|---|---|---|---|---|
| 6,700,773 B1 * | 3/2004 | Adriaansen | ........... | G06F 1/1643 361/679.08 |
| 6,919,921 B1 * | 7/2005 | Morota | ........... | G08B 13/19682 348/E7.086 |
| RE39,959 E * | 12/2007 | Sudo | ........... | H04M 1/2745 345/169 |
| 7,330,923 B2 * | 2/2008 | Wenstrand | ........... | G06F 1/1632 361/679.33 |
| 11,179,628 B2 * | 11/2021 | Tseng | ........... | A63F 13/24 |
| 2004/0095326 A1 * | 5/2004 | Anderson | ........... | G06F 3/0213 345/168 |
| 2004/0145565 A1 * | 7/2004 | Yang | ........... | G06F 3/038 345/163 |
| 2006/0212635 A1 * | 9/2006 | Wenstrand | ........... | G06F 1/1616 710/303 |
| 2009/0115273 A1 * | 5/2009 | Chen | ........... | H02K 5/10 310/88 |
| 2014/0211395 A1 * | 7/2014 | Lin | ........... | G06F 1/1669 361/679.17 |
| 2015/0092332 A1 * | 4/2015 | Yu | ........... | G06F 1/1637 361/679.09 |
| 2017/0038854 A1 * | 2/2017 | Delpier | ........... | G06F 1/1669 |
| 2017/0282060 A1 * | 10/2017 | Wang | ........... | G06F 1/169 |
| 2018/0188774 A1 * | 7/2018 | Ent | ........... | G06F 1/1616 |

(Continued)

*Primary Examiner* — Dmitriy Bolotin
(74) *Attorney, Agent, or Firm* — JCIPRNET (57) ABSTRACT

A portable electronic apparatus includes a first body, a second body pivotally connected to the first body, and a first keyboard detachably disposed on the first body. The first keyboard includes a casing, a plurality of keys disposed on the casing, a first base movably disposed in the casing, a knob disposed on the first base, a magnet fixed to the first base, a second base fixed into the casing and located above the first base, and an electromagnet fixed to the second base as corresponding to the magnet. A top surface of the knob is exposed from and higher than a top surface of the casing. The powered electromagnet generates a magnetic attraction force to the magnet to drive the first base to move towards the second base and increase a height difference between the top surface of the knob and the top surface of the casing.

10 Claims, 7 Drawing Sheets

(56) References Cited

U.S. PATENT DOCUMENTS

2020/0189392 A1* 6/2020 Sung ................... H01F 7/0252
2021/0407310 A1* 12/2021 Finch .................. G06F 40/279

* cited by examiner

PORTABLE ELECTRONIC APPARATUS

CROSS-REFERENCE TO RELATED APPLICATION

This application claims the priority benefit of Taiwan application serial no. 110105475, filed on Feb. 18, 2021. The entirety of the above-mentioned patent application is hereby incorporated by reference herein and made a part of this specification.

BACKGROUND

Technical Field

The disclosure relates to an electronic apparatus, and in particular, relates to a portable electronic apparatus.

Description of Related Art

Generally, in a notebook computer apparatus, the keyboard is integrated with the host, and it is not easy for a user to detach the keyboard from the host according to operational needs. A keyboard is generally divided into an alphabetical key region and a numeric key region. A detachable numeric key region design is later provided to facilitate user operation, and the user is thus allowed to detach the numeric key region from the host according to operational needs. Operational functions provided by most of the numeric key regions are limited, and it is thus difficult to satisfy operational demands such as cursor controlling, application menu starting, application item switching, application item browsing, application item selecting, and application executing and the like.

SUMMARY

The disclosure provides a portable electronic apparatus exhibiting good operational convenience and operational flexibility.

The disclosure provides a portable electronic apparatus including a first body, a second body pivotally connected to the first body, and a first keyboard detachably disposed on the first body. The first keyboard includes a casing, a plurality of keys, a first base, a knob, a magnet, a second base, and an electromagnet. The keys are disposed on the casing. The first base is movably disposed in the casing. The knob is disposed on the first base, and a top surface of the knob is exposed from and is higher than a top surface of the casing. The magnet is fixed to the first base. The second base is fixed into the casing and is located above the first base. The electromagnet is fixed to the second base as corresponding to the magnet. The powered electromagnet generates a magnetic attraction force to the magnet to drive the first base to move towards the second base and increase a height difference between the top surface of the knob and the top surface of the casing.

To sum up, in the portable electronic apparatus provided by the disclosure, the first keyboard may be designed to be detachable and is integrated with the knob. Therefore, a user may use the knob to control a cursor, start an application menu, switch application items, browse an application item, select an application item, and execute an application. On the other hand, the knob may be adjusted upwards by the magnetic force to facilitate user operation. Therefore, the portable electronic apparatus provided by the disclosure exhibits good operational convenience and operational flexibility.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
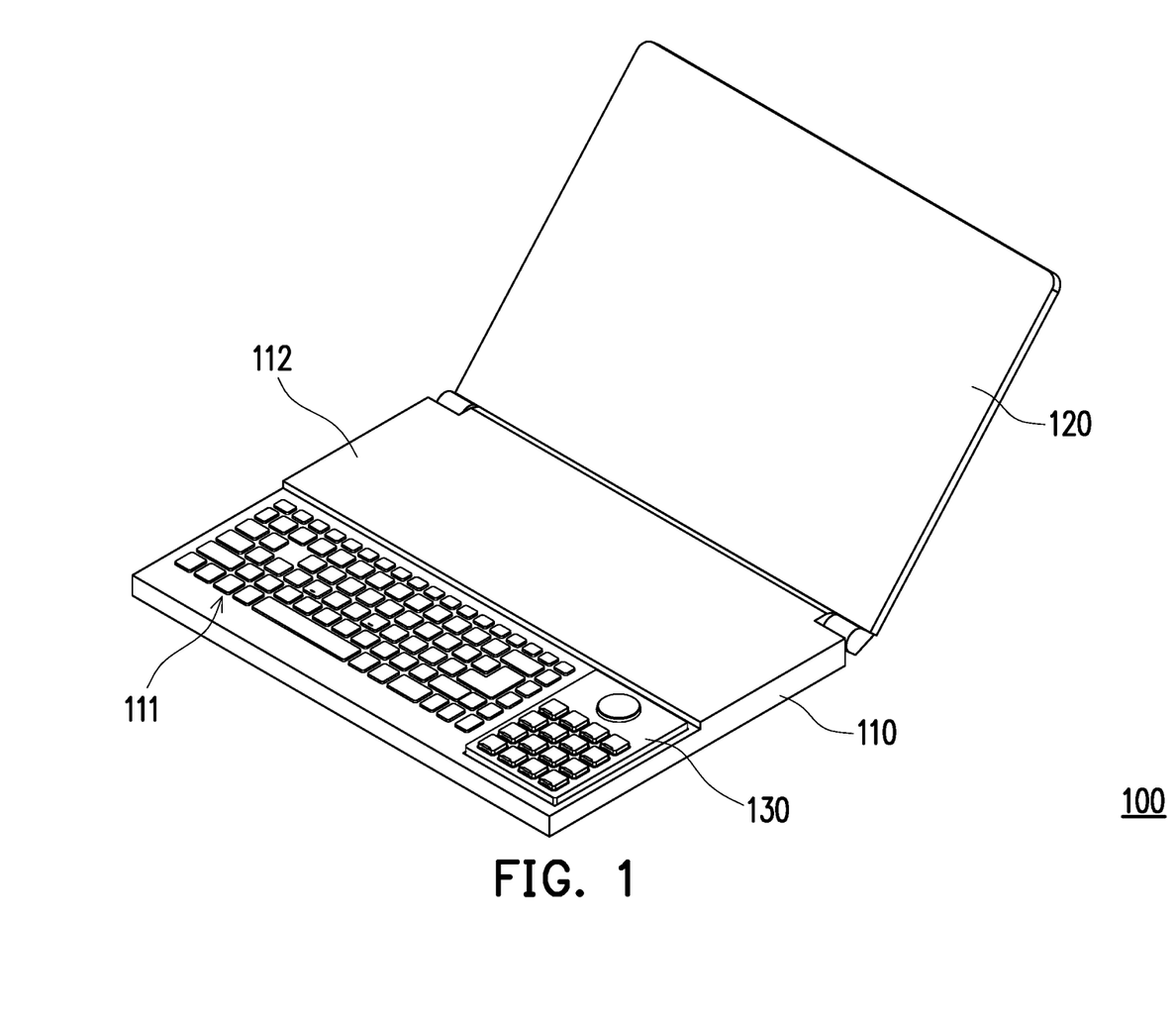
FIG. 1 is a schematic view of a portable electronic apparatus according to an embodiment of the disclosure.
Figure 2:
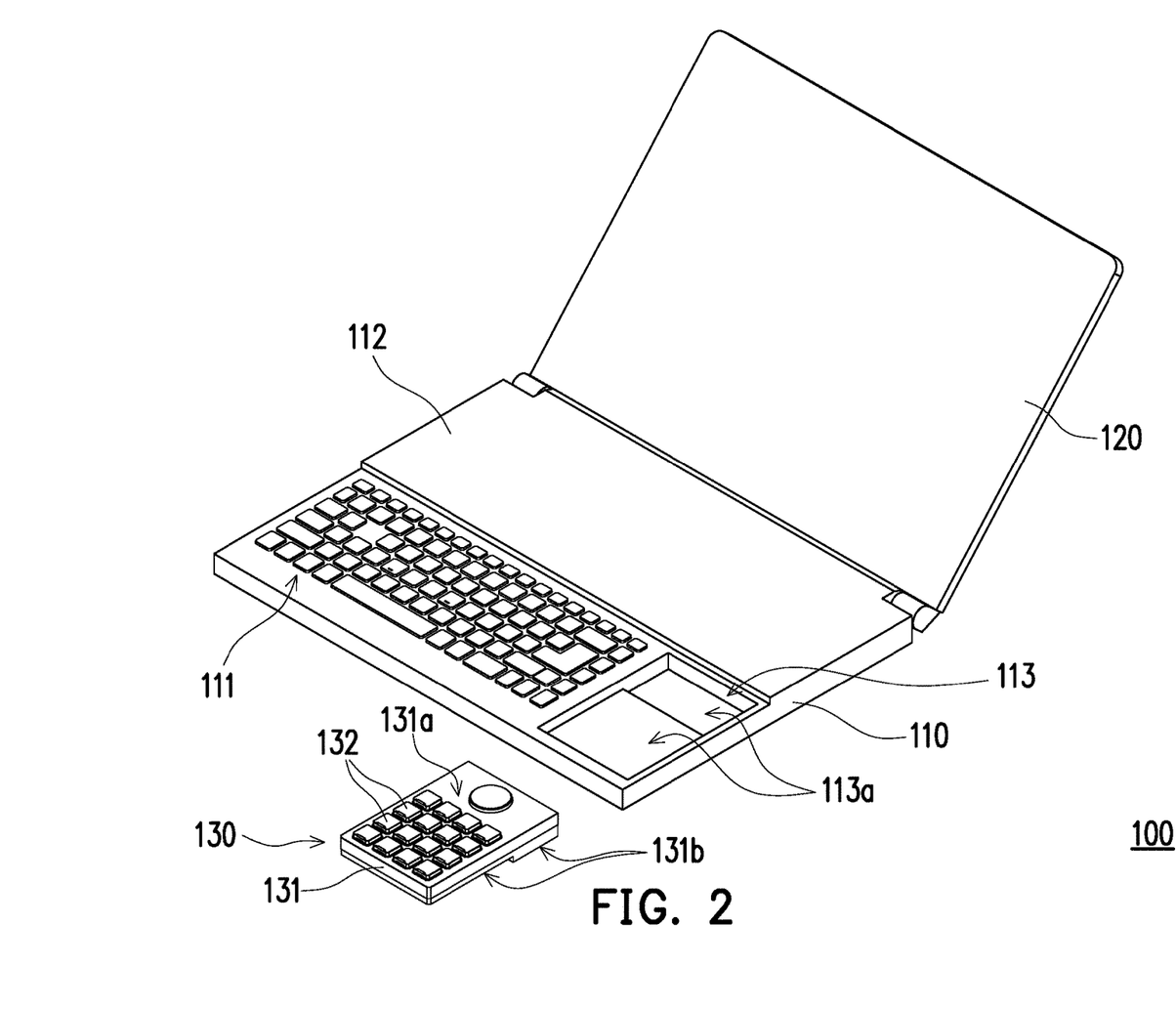
FIG. 2 is a schematic view of detachment of a first keyboard from a first body in FIG. 1.

FIG. 1 is a schematic view of a portable electronic apparatus according to an embodiment of the disclosure. FIG. 2 is a schematic view of detachment of a first keyboard from a first body in FIG. 1. With reference to FIG. 1 and FIG. 2, in this embodiment, a portable electronic apparatus 100 may be a notebook computer and includes a first body 110, a second body 120, and a first keyboard 130. The first body 110 has logic computing and data accessing capabilities and the like, and the second body 120 has an image displaying capability. The second body 120 is pivotally connected to the first body 110 to be rotated and unfolded relative to the first body 110.

The first keyboard 130 is detachably disposed on the first body 110. Depending on operational needs, a user may leave the first keyboard 130 on the first body 110 or detach the first keyboard 130 from the first body 110. To be specific, the first body 110 includes a second keyboard 111 and a touch display panel 112. The first keyboard 130 is disposed side by side the second keyboard 111, and the first keyboard 130 and the second keyboard 111 are located at a same side of the touch display panel 112. The first keyboard 130 may be a numeric keypad, and the second keyboard 111 may be an alphabetical keyboard.

Figure 3:
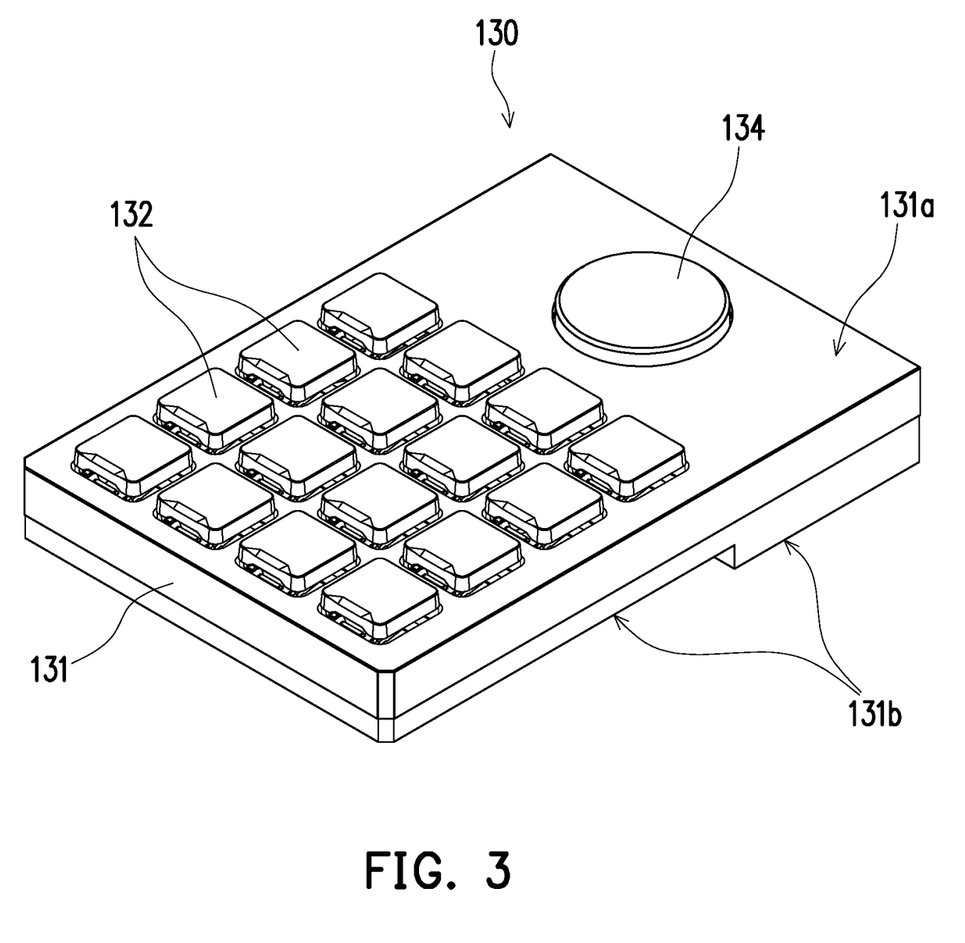
FIG. 3 is a schematic view of the first keyboard in FIG. 2.
Figure 4:
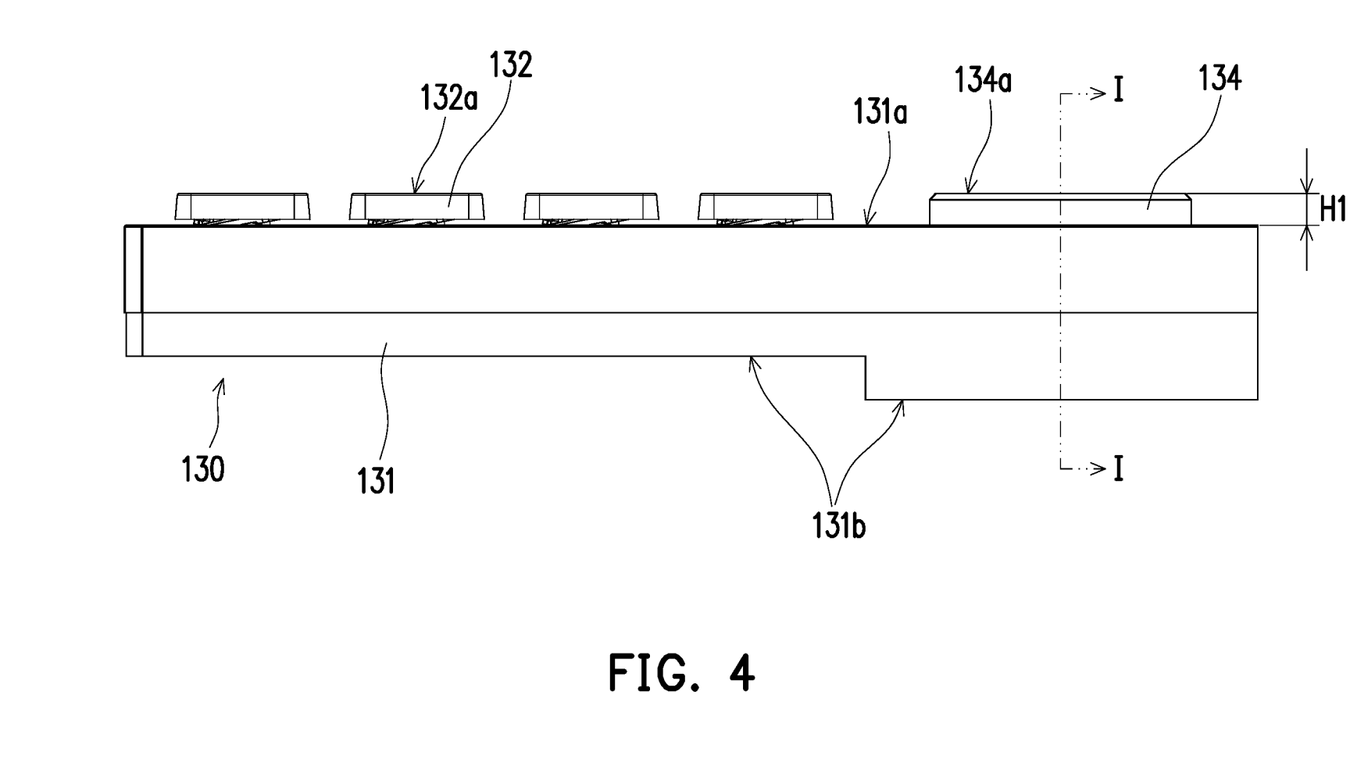
FIG. 4 is a side schematic view of the first keyboard in FIG. 3 in a first mode.

FIG. 3 is a schematic view of the first keyboard in FIG. 2. FIG. 4 is a side schematic view of the first keyboard in FIG. 3 in a first mode. With reference to FIG. 1 to FIG. 4, in this embodiment, the first body 110 has a recess 113 configured to accommodate the first keyboard 130. To be specific, the first keyboard 130 includes a casing 131 and a plurality of keys 132, and the keys 132 are disposed on the casing 131. Further, a pressing surface 132a of each of the keys 132 is higher than a top surface 131a of the casing 131, so that a user may press the keys 132 conveniently. On the other hand, the recess 113 accommodates at least a portion of the casing 131, and the top surface 131a of the casing 131 is located outside the recess 113, so that the user may press the keys 132 easily conveniently.

When the first keyboard 130 is left on the first body 110, at least a portion of the casing 131 is located in the recess 113, and a bottom surface 131b of the casing 131 contacts a bottom surface 113a of the recess 113. To be more specific, the bottom surface 131b of the casing 131 and the bottom surface 113a of the recess 113 are two stepped surfaces with matching and complementary geometric contours. In this way, as the bottom surface 131b of the casing 131 and the bottom surface 113a of the recess 113 are structurally matched, the first keyboard 130 is prevented from moving randomly in the recess 113, so the first keyboard 130 may provide improved stability when being used by the user.

Figure 5:
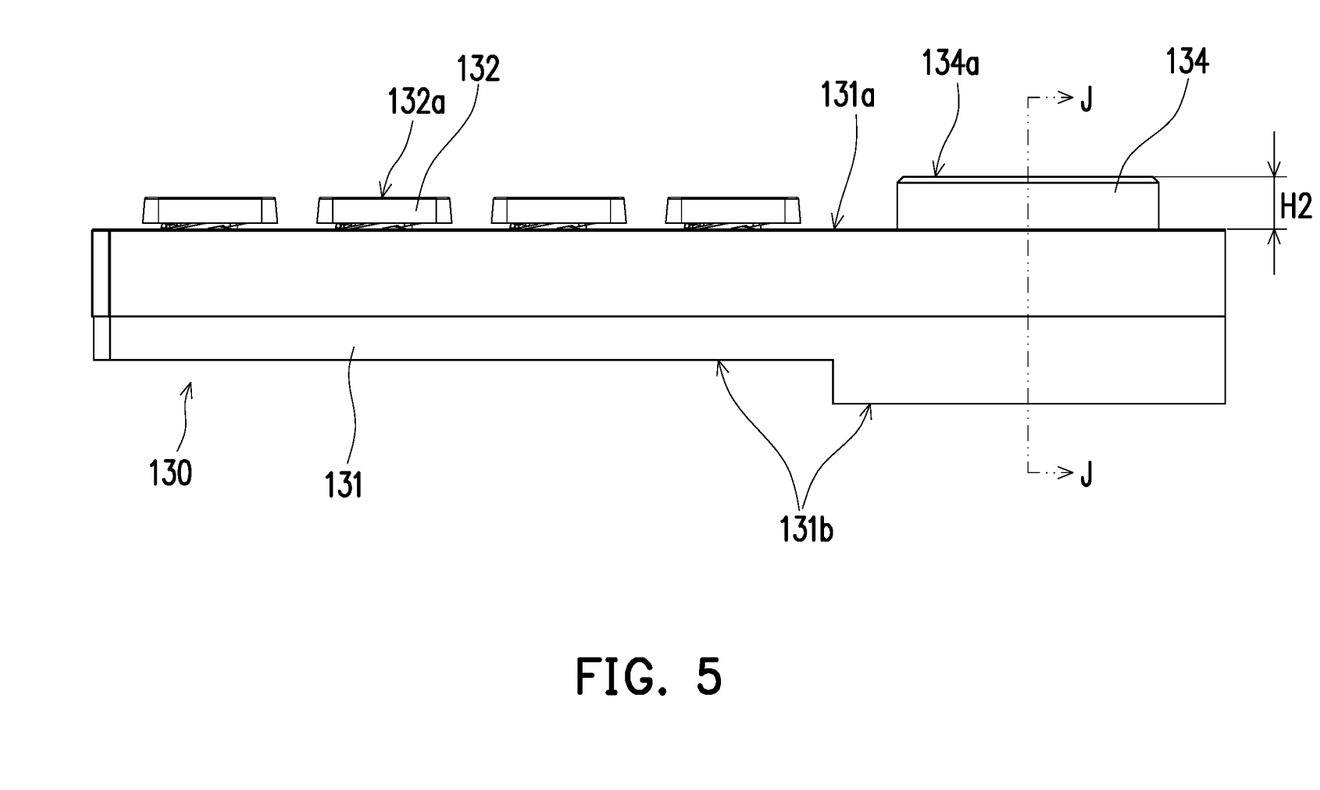
FIG. 5 is a side schematic view of the first keyboard in FIG. 3 in a second mode.
Figure 6:
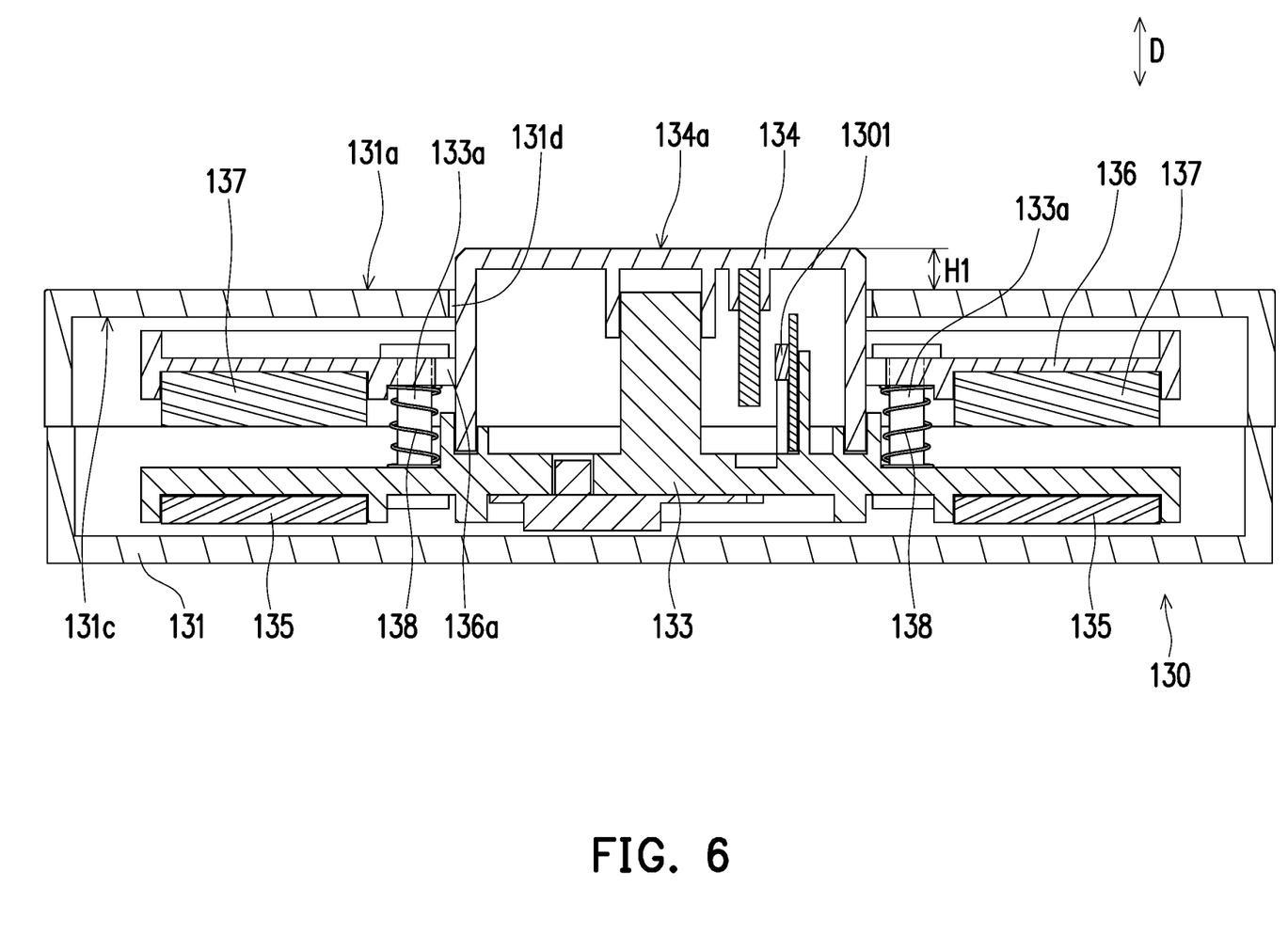
FIG. 6 is a cross-sectional schematic view of the first keyboard in FIG. 4 taken along a cross-sectional line I-I.
Figure 7:
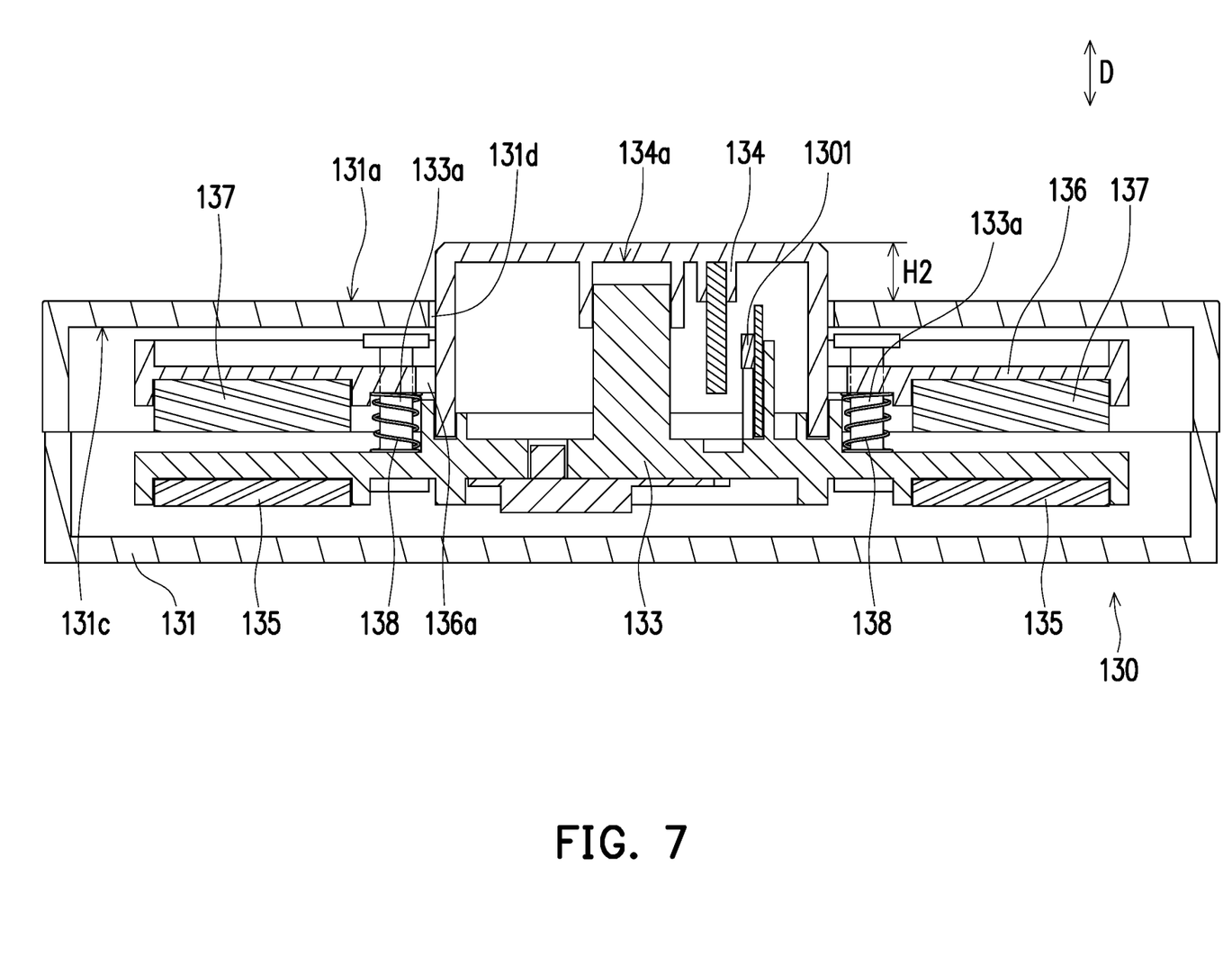
FIG. 7 is a cross-sectional schematic view of the first keyboard in FIG. 5 taken along a cross-sectional line J-J.

FIG. 5 is a side schematic view of the first keyboard in FIG. 3 in a second mode. FIG. 6 is a cross-sectional schematic view of the first keyboard in FIG. 4 taken along a cross-sectional line I-I. FIG. 7 is a cross-sectional schematic view of the first keyboard in FIG. 5 taken along a cross-sectional line J-J. With reference to FIG. 3, FIG. 4, and FIG. 6, in this embodiment, the first keyboard 130 further includes a first base 133, a knob 134, a magnet 135, a second base 136, and an electromagnet 137. The first base 133, one portion of the knob 134, the magnet 135, the second base 136, and the electromagnet 137 are located in the casing 131, and the other portion of the knob 134 is located outside the casing 131. To be specific, the first base 133 is movably disposed in the casing 131 and is configured to move in a direction D perpendicular to the top surface 131a of the casing 131. The knob 134 is rotatably disposed on the first base 133 and is configured to synchronously move together with the first base 133.

As shown in FIG. 4 to FIG. 7, a top surface 134a of the knob 134 is exposed from and is higher than the top surface 131a of the casing 131. In the first mode, the first base 133 and the knob 134 remain stationary, and a height difference between the top surface 134a of the knob 134 and the top surface 131a of the casing 131 is H1. In the second mode, the knob 134 moves together with the first base 133, and a height difference between the top surface 134a of the knob 134 and the top surface 131a of the casing 131 is H2. The height difference H2 is greater than the height difference H1.

As shown in FIG. 1 and FIG. 4, in the first mode, the top surface 134a of the knob 134 is flush with the pressing surface 132a of each of the keys, so the user is prevented from mistakenly touching the knob 134. Moreover, because the top surface 134a of the knob 134 is flush with the pressing surface 132a of each of the keys 132, so that the user may easily cover the second body 120 on the first body 110 completely. As shown in FIG. 5, in the second mode, the top surface 134a of the knob 134 is higher than the pressing surface 132a of each of the keys 132, so that the user may conveniently rotate the knob 134 and is prevented from mistakenly pressing any one of the keys 132 when rotating the knob 134. For instance, the top surface 134a of the knob 134 may be provided with a display screen for displaying an image or text information.

Further, the user may use the knob 134 to control a cursor, start an application menu, switch application items, browse an application item, select an application item, and execute an application. In thus can be seen that the portable electronic apparatus 100 exhibits good operational convenience and operational flexibility. To be specific, the first keyboard 130 may use a light sensor 1301 disposed as corresponding to the knob 134 to obtain a rotation amount of the knob 134, as shown in FIG. 6 and FIG. 7. For instance, the light sensor 1301 may adopt a light receiver or a combination of a light emitter and a light receiver and may be disposed inside the knob 134.

With reference to FIG. 6 and FIG. 7, in this embodiment, a number of the magnet 135 may be plural, and the magnets 135 are fixed to the first base 133 and are symmetrically distributed on an outer periphery of the knob 134. The second base 136 is fixed into the casing 131 and is located above the first base 133. A distance between the first base 133 and the second base 136 changes as the first base 133 moves. Besides, a number of the electromagnet 137 may be plural, and the electromagnets 137 are fixed to the second base 136 as corresponding to the magnets 135 and are symmetrically distributed on the outer periphery of the knob 134.

To be specific, since the electromagnets 137 are disposed as corresponding to the magnets 135 and are symmetrically distributed on the outer periphery of the knob 134, when the electromagnets 137 are powered, magnetic attraction forces generated by the electromagnets 137 to the magnets 135 may be evenly applied to the first base 133, and in this way, the first base 133 may stably move towards the second base 136 in the direction D. At the same time, the magnets 135 and the knob 134 synchronously move together with the first base 133, and the height difference between the top surface 134a of the knob 134 and the top surface 131a of the casing 131 is increased to H2.

With reference to FIG. 3, FIG. 6, and FIG. 7, in this embodiment, the casing 131 has an opening 131d penetrating through the top surface 131a and an inner surface 131c, and the second base 136 has a through hole 136a aligned with the opening 131d. The through hole 136a of the second base 136 and the opening 131d of the casing 131 are located on a moving path of the knob 134. Further, the knob 134 penetrates through the through hole 136a of the second base 136 and the opening 131d of the casing 131 to protrude from the top surface 131a of the casing 131.

With reference to FIG. 4 to FIG. 7, in this embodiment, the first keyboard 130 further includes a plurality of springs 138, and compression springs may be adopted to act as the springs 138. The springs 138 are disposed between the first base 133 and the spring 136. The springs 138 are symmetrically distributed on the outer periphery of the knob 134. Further, two ends of each of the springs 138 abut the first base 133 and the second base 136. When the first base 133 moves towards the second base 136 in the direction D, the springs 138 are compressed and are elastically deformed.

Once the electromagnets 137 are not powered, the magnetic attraction forces applied to the first base 133 disappear, and elastic restoring forces of the springs 138 may drive the first base 133 to move away from the second base 136 in the direction D. In this way, the top surface 134a of the knob 134 is once again flush with the pressing surface 132a of each of the keys 132, and the height difference between the top surface 134a of the knob 134 and the top surface 131a of the casing 131 is restored to H1.

With reference to FIG. 6 and FIG. 7, the first base 133 has a plurality of protrusions 133a extending towards the second base 136, and the protrusions 133a penetrate through the second base 136. The protrusions 133a are symmetrically distributed on the outer periphery of the knob 134, and the springs 138 are sleeved on the protrusions 133a. To be specific, an extending direction of each of the protrusions 133a is parallel to the direction D, and the protrusions 133a are symmetrically distributed on the outer periphery of the knob 134, so the first base 133 is ensured to stably move back and forth in the direction D. Further, the protrusions 133a may prevent the springs 138 from deflecting when being elastically deformed.

In view of the foregoing, in the portable electronic apparatus provided by the disclosure, the first keyboard may be designed to be detachable and is integrated with the knob. Therefore, a user may use the knob to control a cursor, start an application menu, switch application items, browse an application item, select an application item, and execute an application. On the other hand, the knob may be adjusted upwards by the magnetic force to facilitate user operation. Therefore, the portable electronic apparatus provided by the disclosure exhibits good operational convenience and operational flexibility.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A portable electronic apparatus, comprising:
   a first body;
   a second body, pivotally connected to the first body; and
   a first keyboard, detachably disposed on the first body, wherein the first keyboard comprises:
     a casing;
     a plurality of keys, disposed on the casing;
     a first base, movably disposed in the casing;
     a knob, disposed on the first base, wherein a top surface of the knob is exposed from and is higher than a top surface of the casing;
     a magnet, fixed to the first base;
     a second base, fixed into the casing, located above the first base; and
     an electromagnet, fixed to the second base as corresponding to the magnet, wherein the powered electromagnet generates a magnetic attraction force to the magnet to drive the first base to move towards the second base and increase a height difference between the top surface of the knob and the top surface of the casing.

2. The portable electronic apparatus according to claim 1, wherein the first body has a recess, and the recess accommodates at least a portion of the casing.

3. The portable electronic apparatus according to claim 2, wherein a bottom surface of the casing and a bottom surface of the recess are two matched stepped surfaces.

4. The portable electronic apparatus according to claim 1, wherein the top surface of the knob and a pressing surface of each of the keys are higher than the top surface of the casing, the top surface of the knob is flush with the pressing surface of each of the keys, and the top surface of the knob moving together with the first base is higher than the pressing surface of each of the keys after the first base moves towards the second base.

5. The portable electronic apparatus according to claim 1, wherein the first body comprises a second keyboard and a touch display panel, and the first keyboard and the second keyboard are located at a same side of the touch display panel.

6. The portable electronic apparatus according to claim 1, wherein the casing has an opening, the second base has a through hole aligned with the opening, and the knob penetrates through the through hole and the opening.

7. The portable electronic apparatus according to claim 1, wherein the first keyboard further comprises a plurality of springs, the springs are disposed between the first base and the second base, the springs are located on an outer periphery of the knob, and two ends of each of the springs abut the first base and the second base.

8. The portable electronic apparatus according to claim 7, wherein each of the springs is a compression spring.

9. The portable electronic apparatus according to claim 7, wherein the first base has a plurality of protrusions extending towards the second base, the protrusions penetrate through the second base, the protrusions are located on the outer periphery of the knob, and the springs are sleeved on the protrusions.

10. The portable electronic apparatus according to claim 1, wherein the knob moves together with the first base, and moving directions of the first base and the knob are perpendicular to the top surface of the casing.

* * * * *